United States Patent
Zhang et al.

(10) Patent No.: US 10,815,921 B2
(45) Date of Patent: Oct. 27, 2020

(54) SYSTEMS AND METHODS FOR ADAPTIVE ACCELERATION BASED SPEED CONTROL

(71) Applicant: Cummins, Inc., Columbus, IN (US)

(72) Inventors: Roger S. Zhang, Wuhan (CN); Pan Wang, Wuhan (CN); Joey Wang, Beijing (CN)

(73) Assignee: Cummins, Inc., Columbus, IN (US)

( * ) Notice: Subject to any disclaimer, the term of this patent is extended or adjusted under 35 U.S.C. 154(b) by 12 days.

(21) Appl. No.: 15/462,384

(22) Filed: Mar. 17, 2017

(65) Prior Publication Data
US 2017/0191432 A1   Jul. 6, 2017

Related U.S. Application Data

(63) Continuation of application No. PCT/CN2014/086950, filed on Sep. 19, 2014.

(51) Int. Cl.
*F02D 41/02* (2006.01)
*B60W 30/00* (2006.01)
*F02D 29/00* (2006.01)

(52) U.S. Cl.
CPC ......... *F02D 41/0205* (2013.01); *B60W 30/00* (2013.01); *F02D 29/00* (2013.01); *F02D 2200/50* (2013.01); *F02D 2200/501* (2013.01); *F02D 2200/602* (2013.01); *F02D 2250/18* (2013.01)

(58) Field of Classification Search
CPC ............. F02D 41/0205; F02D 2250/18; F02D 2200/501; F02D 2200/602
See application file for complete search history.

(56) References Cited

U.S. PATENT DOCUMENTS

| | | | | |
|---|---|---|---|---|
| 3,673,797 | A * | 7/1972 | Wilkinson | F02B 37/105 60/39.17 |
| 4,577,718 | A | 3/1986 | Ueno | |
| 5,878,711 | A * | 3/1999 | Kamura | F02D 31/008 123/295 |
| 5,904,128 | A * | 5/1999 | Shimada | F02D 31/003 123/295 |
| 6,042,505 | A | 3/2000 | Bellinger | |
| 6,067,957 | A | 5/2000 | Motose et al. | |

(Continued)

FOREIGN PATENT DOCUMENTS

| CN | 103375289 | 1/2011 |
|---|---|---|
| CN | 101956815 | 12/2012 |

(Continued)

OTHER PUBLICATIONS

International Search Report and Written Opinion issued for PCT Application No. PCT/CN2014/086950, dated Jun. 17, 2015, 12 pages.

*Primary Examiner* — George C Jin
(74) *Attorney, Agent, or Firm* — Foley & Lardner LLP

(57) ABSTRACT

A method of controlling speed of an internal combustion engine is disclosed. The method includes receiving a load parameter input. The method also includes determining a requested speed demand and detecting a change in load based on the load parameter input. The method also includes determining a modified speed demand based on the detected change in load, and modifying the requested speed demand to the modified speed demand.

19 Claims, 6 Drawing Sheets

(56) References Cited

U.S. PATENT DOCUMENTS

| | | | | |
|---|---|---|---|---|
| 6,308,516 | B1* | 10/2001 | Kamada | E02F 9/2228 60/450 |
| 6,314,359 | B1 | 11/2001 | Janic et al. | |
| 6,378,492 | B1* | 4/2002 | Liu | F02D 31/003 123/339.18 |
| 6,742,497 | B1* | 6/2004 | Kanamaru | F02D 31/002 123/339.11 |
| 8,176,895 | B2* | 5/2012 | Kusaka | F02D 31/007 123/357 |
| 8,781,694 | B1* | 7/2014 | Sheidler | A01D 41/1274 701/50 |
| 2003/0209224 | A1* | 11/2003 | Lee | F02P 5/1508 123/339.11 |
| 2004/0209718 | A1* | 10/2004 | Ishibashi | B60W 10/103 474/18 |
| 2007/0169743 | A1* | 7/2007 | Kobayashi | A01D 34/67 123/352 |
| 2009/0025661 | A1* | 1/2009 | Itoga | E02F 9/226 123/41.12 |
| 2009/0101101 | A1* | 4/2009 | Iwamoto | E02F 9/2246 123/198 C |
| 2010/0004829 | A1* | 1/2010 | Tanaka | B60K 6/48 701/48 |
| 2010/0094490 | A1* | 4/2010 | Alston | B63H 21/17 701/21 |
| 2010/0145581 | A1* | 6/2010 | Hou | B60W 30/1882 701/50 |
| 2010/0218493 | A1* | 9/2010 | Nakamura | E02F 9/2235 60/426 |
| 2010/0332102 | A1* | 12/2010 | Akiyama | E02F 9/2232 701/99 |
| 2012/0053769 | A1* | 3/2012 | Kumazaki | B60K 6/445 701/22 |
| 2012/0260644 | A1* | 10/2012 | Kadlicko | F15B 1/02 60/413 |
| 2013/0036729 | A1* | 2/2013 | Kinugawa | F16H 61/421 60/446 |
| 2014/0188373 | A1* | 7/2014 | Kawaguchi | E02F 9/2075 701/110 |
| 2015/0000636 | A1* | 1/2015 | Stockbridge | B60H 1/3222 123/350 |
| 2015/0059693 | A1* | 3/2015 | Goho | F02D 31/002 123/399 |
| 2015/0135693 | A1* | 5/2015 | Murakami | F15B 13/01 60/327 |

FOREIGN PATENT DOCUMENTS

| | | |
|---|---|---|
| CN | 102828845 | 10/2013 |
| FR | 2942855 | 9/2010 |
| JP | 01106933 | 4/1989 |
| JP | 2009-029424 | 2/2009 |

\* cited by examiner

SYSTEMS AND METHODS FOR ADAPTIVE ACCELERATION BASED SPEED CONTROL

CROSS-REFERENCE TO RELATED APPLICATIONS

The present application is a continuation of PCT Application No. PCT/CN2014/086950 filed Sep. 19, 2014, the contents of which are incorporated herein by reference in their entirety.

BACKGROUND

The present invention relates generally to the field of control systems for internal combustion engines, and more particularly to control systems for internal combustion engines including adaptive accelerator pedal based speed control.

Internal combustion (IC) engines generate power necessary to propel a vehicle and/or to power auxiliary loads. An IC engine's power output is a function of its torque multiplied by its engine speed. Torque performance is typically illustrated by a torque curve, which is a plot of an engine's maximum load (e.g., torque) capacity across a range of engine speeds. For every engine speed, there is a maximum torque capacity. In general, IC engine performance, fuel efficiency, and emissions are optimized when engine torque requirements are matched to specific engine speeds. Thus, as torque demands change, it is desirable to control engine speed to the most efficient speeds for particular torque demands.

SUMMARY

One embodiment relates to a method of controlling the speed of an internal combustion engine. The method includes receiving a load parameter input. The method also includes determining a requested speed demand and detecting a change in load based on the load parameter input. The method also includes determining a modified speed demand based on the detected change in load, and modifying the requested speed demand to the modified speed demand.

Another embodiment relates to an apparatus. The apparatus includes an internal combustion engine, a transmission, and a controller communicably coupled to the internal combustion engine and to the transmission. The controller is structured to receive a load parameter input. The controller is also structured to determine a requested speed demand and to detect a change in load based on the load parameter input. The controller is also structured to determine a modified speed demand based on the detected change in load, and to modify the requested speed demand to the modified speed demand.

Yet another embodiment relates to an apparatus. The apparatus includes an accelerator pedal based speed control module, an unloading condition detection module, and a delta speed based speed control module. The accelerator pedal based speed control module is structured to determine a requested speed demand. The unloading condition detection module is structured to receive a load parameter input and detect a change in load based on the load parameter input. The delta speed based speed control module is structured to determine a modified speed demand based on the requested speed demand and detected change in load. The accelerator pedal based speed control module is further structured to modify the requested speed demand to the determined modified speed demand.

DETAILED DESCRIPTION

Figure 1:
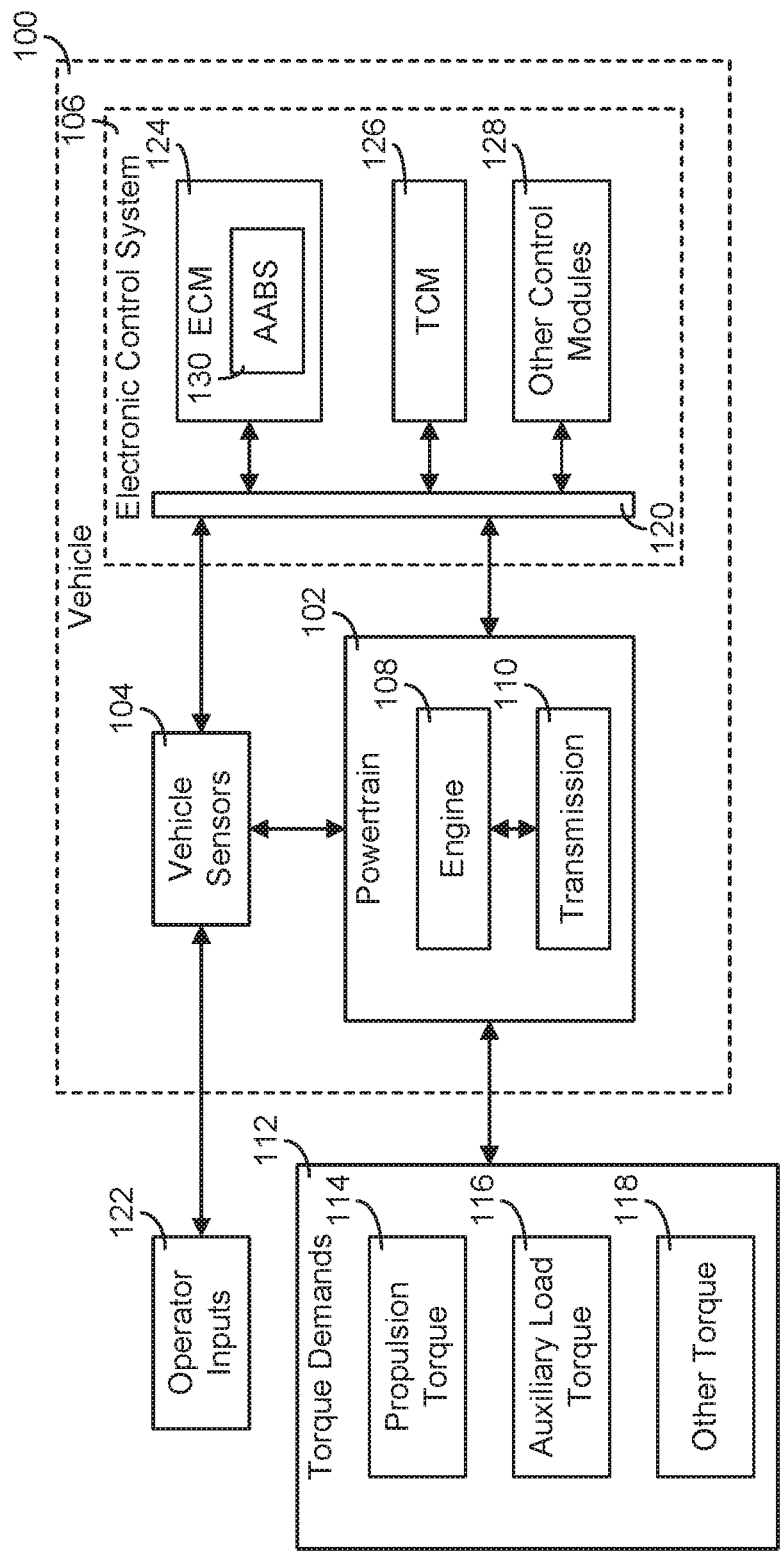
FIG. 1 is a block diagram of a vehicle capable of adaptive accelerator based speed control, according to an exemplary embodiment.

Relating generally to the figures, systems and methods for adaptive accelerator based speed control are described. More particularly, systems and methods for controlling vehicle speed or engine speed during sudden load changes are described. The systems and methods may be implementable in vehicles that experience large, rapid load swings (e.g., an excavator, dump truck, or other vehicle designed for heavy machinery operation). In such vehicles, a large load swing may occur when a large torque load is removed from the vehicle. When such a load swing occurs, the engine or vehicle may experience a momentary speed increase than desired as the load has significantly lessened while engine fueling has not yet adjusted for the new load. The systems and methods of the present disclosure control the requested speed of the engine or vehicle to prevent speed overshooting. Preventing speed overshooting occurs by controlling the trajectory of the engine or vehicle speed as the speed governor of the vehicle responds to a sudden load change. In other words, the systems and methods of the present disclosure may be used to control the engine speed of a vehicle during load changes and to manage the vehicle's response to the load change.

During operation, a vehicle's internal combustion (IC) engine generates torque to propel the vehicle and/or to power auxiliary loads. For example, to accelerate a vehicle, an operator adjusts an accelerator pedal or throttle lever to directly demand a particular torque or speed from the engine. At the same time, other vehicle systems may independently demand additional torque from the engine. For example, heavy-duty equipment such as trucks, tractors, construction equipment and the like may include auxiliary loads such as power take-offs (PTOs) and pumps that demand additional torque from the engine. In addition, other engine-powered devices (e.g., air-conditioner compressors, alternators, servo pumps, etc.) may also demand torque from the engine.

Torque demand during vehicle operation can be highly variable based on variable loads applied to the engine. For example, an engine of a loader may experience significant variable torque demands in response to significant variations in load while performing a digging operation. During a digging operation, torque demand increases sharply as the loader positions a tool (e.g., a bucket) to engage a load (e.g., earth), and decreases sharply as soon as the loader dumps the load.

The speed of the vehicle may be governed by, for example, an accelerator based speed (ABS) control. The ABS reference speed may be based on, for example, the accelerator pedal position. For a given fixed accelerator pedal position, the ABS control has a fixed no-load reference speed and droop slope. When the vehicle experiences a sudden unloading, the engine speed tends to increase suddenly due to the imbalance between the engine output and actual load. The speed governor reacts by decreasing the engine output torque. As the engine output torque is reduced, the ABS reference speed may increase according to its droop characteristics. The combination of the increasing ABS reference speed and natural speed overshoot causes the final target speed to be overshot. The overshooting results in inefficient engine operation and non-optimal fuel consumption (i.e., increased fuel consumption and decreased fuel efficiency during an overshooting event).

The present disclosure provides a control system that controls the speed governor response to large, sudden load swings. In one embodiment, the ABS reference speed may be manipulated dynamically as the load on the vehicle changes. For example, the ABS reference speed may be momentarily reduced to avoid overshooting when the load suddenly decreases during an unloading event. Likewise, the systems and methods may also be used to momentarily increase the ABS reference speed to avoid undershooting when the vehicle experiences a sudden increased load.

The systems and methods of the present disclosure may generally be configured to identify an unloading condition (or other load change condition) and reduce the ABS reference speed proportionally to the load change. The unloading condition may be identified by, for example, observing an engine torque reduction, an uncommanded speed increase of the vehicle, or using an independent load measure (e.g., hydraulic system pressure, operator input, etc.).

Referring to FIG. 1, a block diagram of a vehicle 100 capable of adaptive accelerator based speed (AABS) control is shown according to an exemplary embodiment. In general, vehicle 100 includes a powertrain 102, numerous vehicle sensors 104, and an electronic control system 106.

Powertrain 102 includes an IC engine 108 operatively coupled to a transmission 110. IC engine 108 can be powered by any of several different types of fuel, such as gasoline, diesel, or natural gas, among others. Transmission 110 includes a plurality of gears through which torque is transferred from IC engine 108 to satisfy various torque demands 112. In other embodiments, transmission 110 is a continuously variable transmission. Torque demands 112 may include propulsion torque demands 114, auxiliary load torque demands 116, and/or other torque demands 118.

Electronic control system 106 is operatively coupled to powertrain 102 and to vehicle sensors 104 via a bus, such as a Controller Area Network (CAN) bus 120. Electronic control system 106 receives signals (e.g., vehicle parameter inputs) from vehicle sensors 104, which may include hundreds of sensors that measure a wide range of vehicle operating parameters and operator inputs 122 (e.g., accelerator position, operating mode selection, etc.). Electronic control system 106 analyzes the signals received from vehicle sensors 104 and outputs control signals to control various aspects of the powertrain 102 and other vehicle components.

Electronic control system 106 includes various control modules such as an engine control module (ECM) 124, a transmission control module (TCM) 126, and/or other control modules 128, such as a body control module, a telematics control module, and the like. The various control modules of electronic control system 106 may control the operation of the vehicle. For example, electronic control system 106 may serve as a speed governor controlling the speed of the vehicle. Electronic control system 106 may determine an ABS reference speed that is used to control the speed of the engine or vehicle. The ABS reference speed for the vehicle is set based on the current operating status of the vehicle (i.e., based on the load the vehicle is carrying and the current accelerator pedal position).

Electronic control system 106 further includes an adaptive accelerator based speed control (AABS) module 130. In the example embodiment depicted in FIG. 1, AABS module 130 is incorporated into ECM 124; however, in other example embodiments, AABS module 130 is a stand-alone module or is incorporated in other control modules, such as TCM 126. Moreover, in other example embodiments, certain control modules are integrated into a single module. For example, in certain example embodiments, ECM 124 and TCM 126 are integrated into a powertrain control module (PCM). In addition to receiving signals from vehicle sensors 104, the ECM 124, TCM 126, other control modules 128, and AABS module 130 are in operative communication with each other via CAN bus 120.

As mentioned above, electronic control system 106, including ECM 124, TCM 126, and AABS module 130 provide systems and methods for adaptive accelerator based speed control of IC engine 108. In certain embodiments, the adaptive accelerator based speed control includes further optimizations based on external factors (e.g., altitude and/or temperature) and/or based on priorities associated with particular applications.

Figure 2:
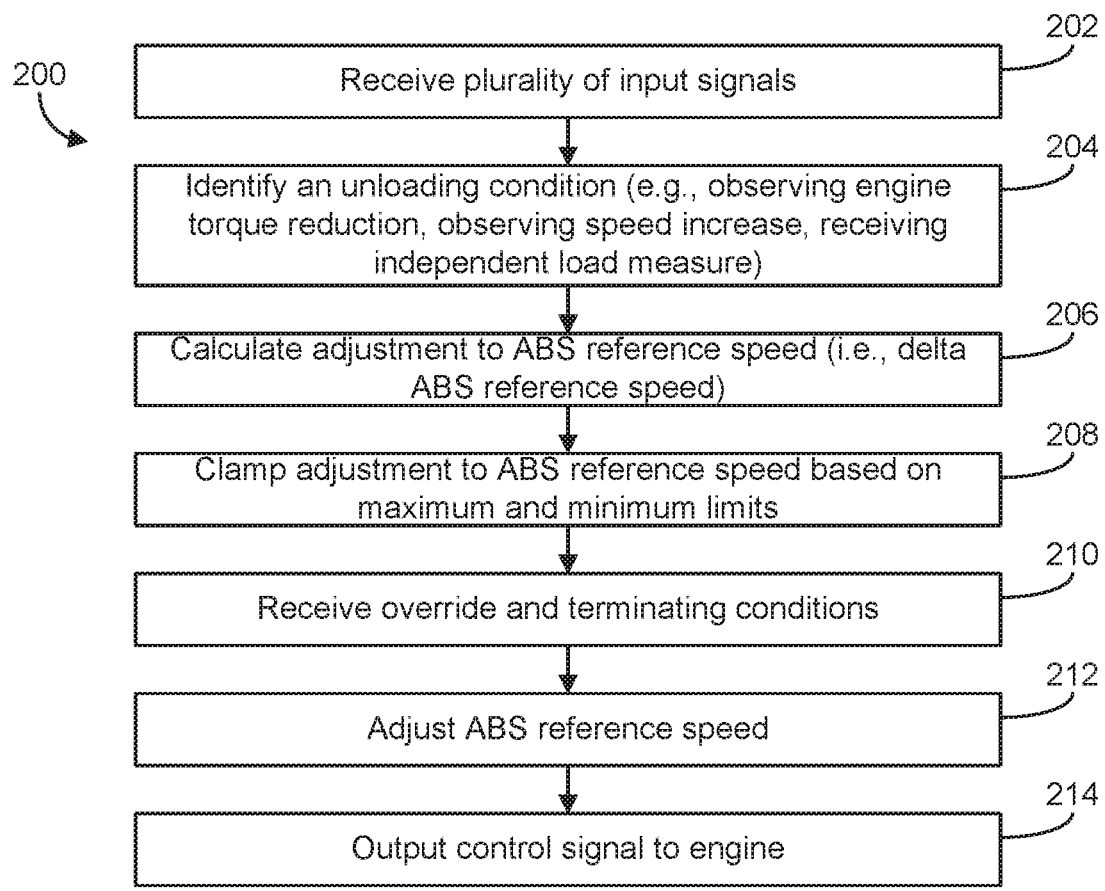
FIG. 2 is a flow chart of a process of adaptive accelerator based speed control, according to an exemplary embodiment.

Referring now to FIG. 2, a flow diagram of a method 200 of adaptive accelerator based speed (AABS) control is shown, according to an exemplary embodiment. Method 200 may be performed, for example, by electronic control system 106 and more specifically by AABS module 130. For clarity and brevity, method 200 is explained with respect to AABS module 130; however, in other embodiments, method 200 may be performed by electronic control system 106 in general, or more specifically by ECM 124, TCM 126, other control modules 128, AABS module 130, or any combination thereof.

Method 200 includes receiving a plurality of input signals at AABS module 130 (block 202). The input signals may be operator inputs 112 or input signals from one or more vehicle sensors 104. The input signals may be received over CAN bus 120 or directly from other devices. Input signals may generally include torque demands 112 and speed of IC engine 108, other inputs from vehicle sensors 104 (e.g., hydraulic oil pressure, current vehicle load, engine acceleration, etc.) and/or operator inputs 122 (e.g., accelerator position, operating mode of the vehicle, etc.).

Method 200 further includes identifying an unloading condition based on the plurality of input signals (block 204). An unloading condition may generally signify that the load of the vehicle has been reduced, and that the ABS reference speed needs to be adjusted in response to the load change. The unloading condition may be identified in various ways. For example, AABS module 130 may observe a reduction in engine torque based on an input signal from torque demands 112. The reduction in engine torque may occur in response to the speed governor's response to a speed increase. As another example, AABS module 130 may observe an increase in vehicle speed that was uncommanded by electronic control system 106. As another example, AABS module 130 may receive a hydraulic system pressure from a vehicle sensor 104 which may indicate a change in load. As another example, AABS module 130 may receive an operator input 122 such as a lever release which may correspond with an unloading process. AABS module 130 may be configured to receive the input signals and determine if the input signal indicates a load change or not. AABS module 130 may be configured to use multiple input signals in conjunction with one another to identify the unloading condition. The activities of block 204 is described in greater detail in FIG. 6.

If an unloading condition is identified, method 200 further includes calculating an adjustment of the ABS reference speed (block 206). In response to the unloading condition, the ABS reference speed should be reduced to compensate for the lighter load of the vehicle. The adjustment to the ABS reference speed may be calculated as a difference between the current ABS reference speed and a new desired ABS reference speed (hereinafter referred to as a "delta" ABS reference speed). The activities of block 206 is described in greater detail in FIG. 7.

Method 200 further includes "clamping" the delta ABS reference speed based on maximum and minimum limits for the delta ABS reference speed (block 208). For example, if the delta ABS reference speed is too large, the sudden drop in ABS reference speed may not lead to optimal vehicle performance and optimal fuel economy savings, and AABS module 130 may limit the change in ABS reference speed. As another example, if a change in ABS reference speed is indicated by the delta ABS reference speed, but is less than a minimum threshold value, the minimum threshold value may be used as the delta ABS reference speed. The maximum and minimum threshold values may be pre-set, or may be based on the current vehicle performance and condition (e.g., AABS module 130 may determine a threshold relating to maximum allowable change in ABS reference speed to prevent a volatile change in vehicle performance).

Method 200 further includes receiving override and terminating conditions (block 210). Override and terminating conditions may include conditions that may impact vehicle performance based on the change in ABS reference speed. For example, an engine acceleration limit may be specified that prevents a change in ABS reference speed from being implemented that may negatively impact the engine. Method 200 may consider the override and terminating conditions and adjust the delta ABS reference speed accordingly.

Method 200 further includes adjusting the ABS reference speed by subtracting the delta ABS reference speed from the current ABS reference speed (block 212). The adjustment may be a temporary adjustment. In other words, the adjustment to the ABS reference speed is temporary while the vehicle goes through the unloading condition, and returns to the regularly calculated ABS reference speed after the unloading condition. The delta ABS reference speed may be applied at block 212 by AABS module 130 while the vehicle is still experiencing one or more conditions as indicated by one or more input signals received at block 202 (i.e., while the engine torque is still reduced, while the vehicle speed is still above a target speed, while the hydraulic system pressure is still above a threshold, etc.). The result is that while the vehicle is experiencing an unloading condition that impacts the vehicle performance and speed, the target speed of the vehicle as indicated by the ABS reference speed is reduced temporarily to a speed less than the target speed, until the vehicle returns to a stable load and performance.

Method 200 further includes outputting a control signal (via e.g., ECM 124) to cause IC engine 108 to accelerate or decelerate based on the adjusted ABS reference speed (block 214). As mentioned above, the control signal may be provided as a temporary control of IC engine 108 until normal operation of IC engine 108 may resume.

Method 200 is described with reference to adjusting an ABS reference speed based on an unloading condition. It will be appreciated that, in some embodiments, method 200 may be applied to increase engine speed during a condition in which the vehicle load increases. For example, the delta ABS reference speed may be a value indicating an increase in ABS reference speed instead of a decrease in ABS reference speed.

Figure 3:
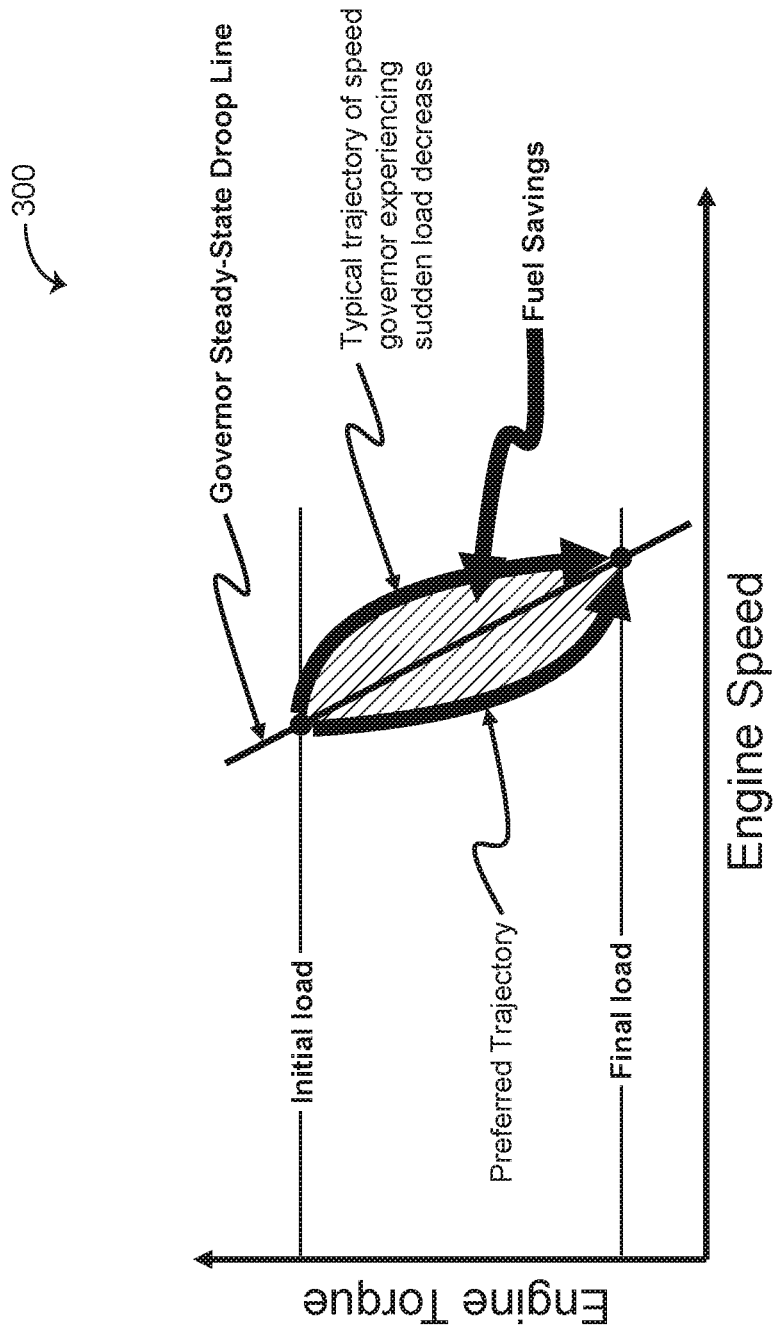
FIGS. 3-4 are graphs illustrating fuel economy implications of the implementation of the systems and methods of the present disclosure, according to an exemplary embodiment.

Referring to FIG. 3, a graph 300 illustrating fuel savings by applying method 200 is illustrated. Graph 300 illustrates activity during an unloading condition of the vehicle. In typical systems, during an unloading condition, an overshooting condition occurs where the trajectory of the ABS reference speed provided by the speed governor is greater than a steady-state droop line. By applying method 200, the preferred trajectory is achieved where the ABS reference speed provided by the speed governor is less than the steady-state droop line. The shaded area represents a possible fuel savings based on the reduced fuel required to maintain the vehicle at the preferred speed trajectory.

Figure 4:
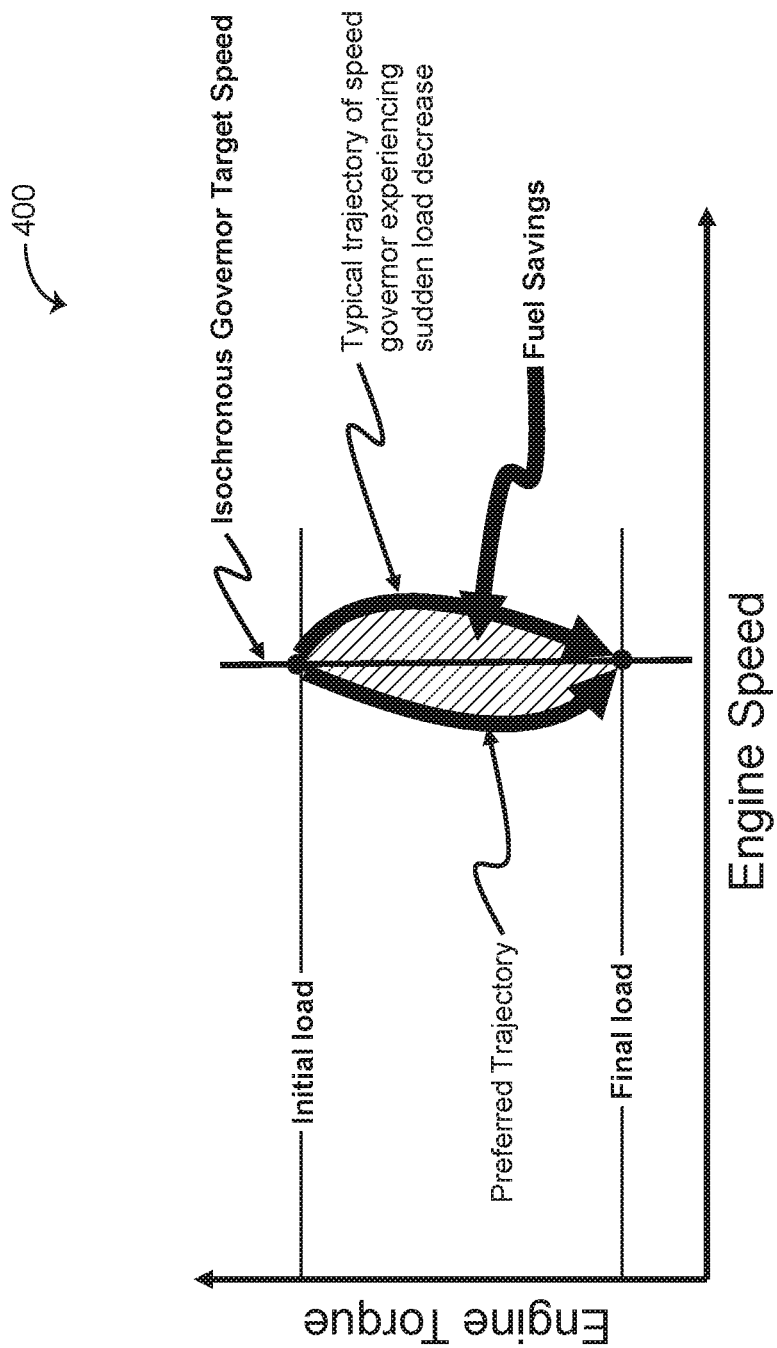

Referring to FIG. 4, another graph 400 illustrating fuel savings by applying method 200 is illustrated. Graph 400 illustrates activity during an unloading condition of the vehicle, for an isochronous governor. Similarly to graph 300, graph 400 illustrates the typical ABS reference speed trajectory, and the preferred trajectory for the ABS reference speed based on the application of method 200.

Figure 5:
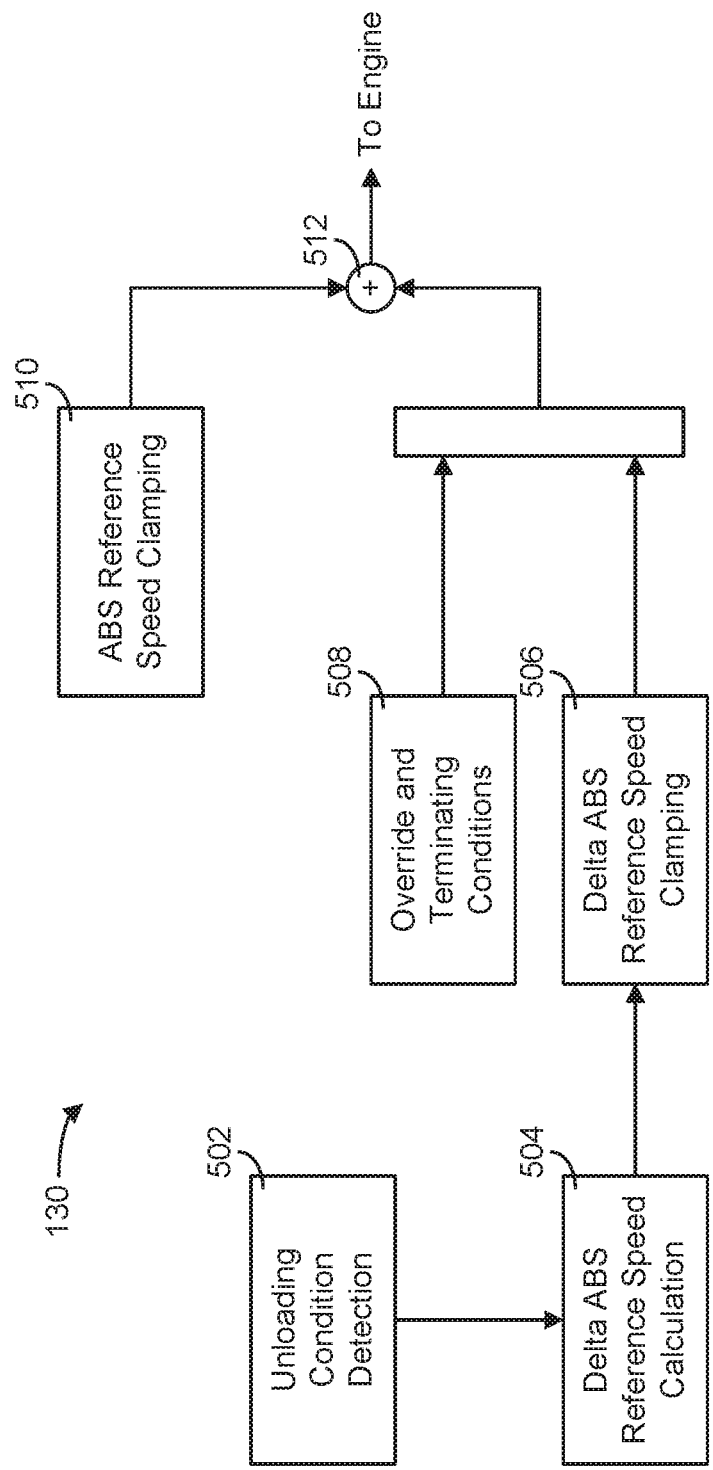
FIG. 5 is a block diagram of an adaptive accelerator based speed module, according to an exemplary embodiment.

Referring now to FIG. 5, a block diagram of an example AABS module 130 configured to determine an adaptive accelerator based speed control is shown according to an exemplary embodiment. AABS module 130 generally includes an unloading condition detection module 502 generally configured to determine whether an unloading condition is occurring. Unloading condition detection module 502 is configured to receive a plurality of input signals from various sources in the vehicle and to determine if an unloading condition is occurring. If an unloading condition is occurring, unloading condition detection module 502 may indicate to AABS module 130 to enable adaptive accelerator based speed control. Unloading condition detection module 502 is shown in greater detail in FIG. 6.

AABS module 130 further includes a delta ABS reference speed calculation module 504 generally configured to calculate a change to the ABS reference speed in response to an unloading condition (e.g., the delta ABS reference speed as described above). Delta ABS reference speed calculation module 504 may use a variety of input signals relating to vehicle performance to determine an optimal delta ABS reference speed. Delta ABS reference speed calculation module 504 is shown in greater detail in FIG. 7.

AABS module 130 further includes a clamping module 506 generally configured to clamp the delta ABS reference speed calculated by delta ABS reference speed calculation module 504. For example, if the delta ABS reference speed exceeds an upper limit, the delta ABS reference speed may be clamped at the upper limit to prevent the ABS reference speed from significantly changing too quickly. If the delta ABS reference speed is less than a lower limit, the delta ABS reference speed may be increased to the lower limit. Clamping module 506 may be implemented to ensure that the change in ABS reference speed results in a proper response to the load change.

AABS module 130 further includes an override module 508. Override module 508 may generally receive one or more override or terminating conditions from one or more input signals. For example, override or terminating conditions may include conditions relating to the engine acceleration, to prevent the engine from accelerating beyond a threshold. The override and terminating conditions may be used to ensure that the vehicle does not go through a condition that may impact vehicle performance. The override and terminating conditions may be applied to the delta ABS reference speed to adjust the delta ABS reference speed, or to prevent application of the delta ABS reference speed.

AABS module 130 further includes an ABS reference speed calculation module 510 generally configured to calculate the ABS reference speed for the vehicle during normal operation. AABS module 130 may apply the delta ABS reference speed to the normal ABS reference speed at module 512 and output the modified ABS reference speed to the vehicle engine (or other module) for controlling the speed of the vehicle.

Figure 6:
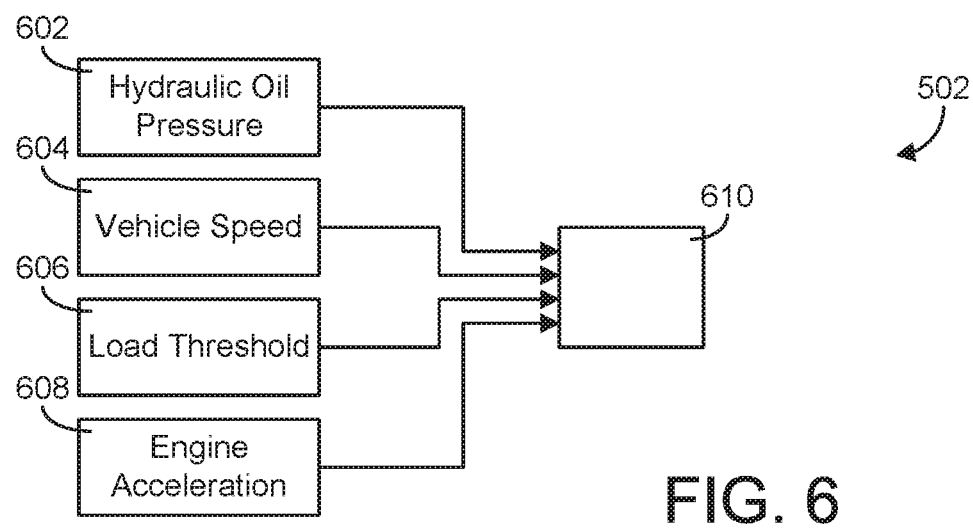
FIG. 6 is a block diagram of an unloading condition detection module, according to an exemplary embodiment.

Referring now to FIG. 6, the activities of unloading condition detection module 502 is shown in greater detail. Module 502 receives a plurality of input signals from operator inputs 112 or one or more vehicle sensors 104. For example, module 502 may receive an input signal 602 relating to hydraulic oil pressure. Input signal 602 may indicate the current hydraulic oil pressure and a threshold for the hydraulic oil pressure for the hydraulic system of the vehicle. The hydraulic oil pressure may provide an indication to the current load of the vehicle.

Module 502 may receive an input signal 604 relating to the speed of the vehicle. Input signal 604 may indicate the current governed speed of the vehicle (i.e., the speed of the vehicle which is being controlled by the speed governor). Input signal 604 may further indicate a speed threshold for the vehicle (i.e., a maximum vehicle speed given the load on the vehicle and other vehicle properties). Module 502 may receive an input signal 606 relating to the load of the vehicle. The load of the vehicle may be indicated as a percentile (e.g., the load is represented as a percentile of the maximum allowable load for the vehicle). Input signal 606 may further indicate the load threshold itself. Module 502 may receive an input signal 608 relating to the engine speed demand and threshold. For example, the engine may have a maximum allowable speed deviation based on the current load of the vehicle and other vehicle properties. Yet other input signals relating to other vehicle properties may be received by module 502.

A module 610 may be configured to receive the various input signals and to determine if an unloading condition is occurring. The unloading condition may be detected based on one input signal or a combination of input signals. For example, if input signal 602 indicates a change in hydraulic oil pressure beyond the threshold, an unloading condition may be determined. As another example, if input signal 604 indicates a sudden change in vehicle speed, an unloading condition may be determined. As another example, if input signal 606 indicates a change in the load from a previous input signal for the load, an unloading condition may be determined. As another example, if input signal 608 indicates a change in engine speed, an unloading condition may be determined. Input signals 604, 606, 608 may be checked against a previous condition or previous input signals. In other words, if input signals 604, 606, 608 indicate a change in vehicle performance, an unloading condition may be determined.

Figure 7:
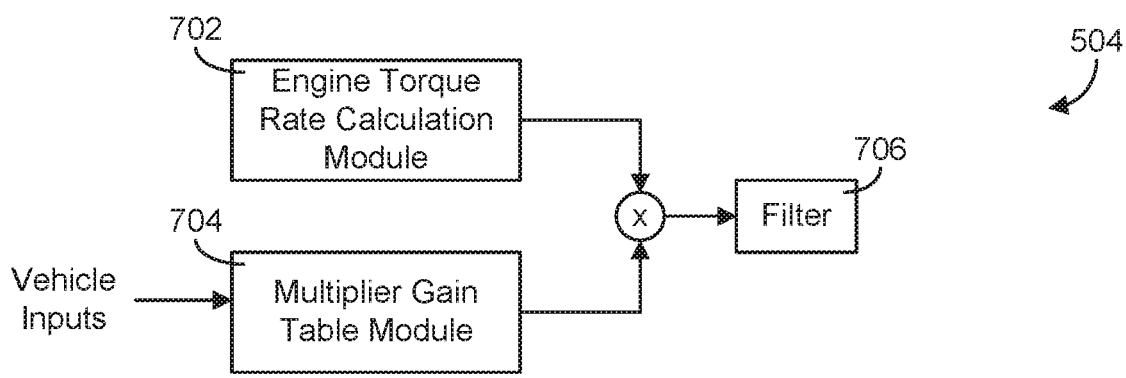
FIG. 7 is a block diagram illustrating a calculation of an ABS reference speed, according to an exemplary embodiment.

Referring now to FIG. 7, the activities of delta ABS reference speed calculation module 504 is shown in greater detail. Module 504 includes an engine torque rate calculation module 702 and a multiplier gain table module 704 for calculating a delta ABS reference speed, and a first order filter 706 for smoothing the result of the calculation.

Various inputs may be provided to the multiplier gain table module 704. The inputs may include, for example, an AABS curve index, current governed speed, AABS speed delta multiplier speed axis and AABS speed delta multiplier table. The various inputs may be used by multiplier gain table module 704 to calculate a speed adjustment value.

Engine torque rate calculation module 702 may be configured to calculate the current engine torque rate. The calculation may be based on the net engine torque derivative (i.e., the derivative of the governor response). The speed adjustment value calculated by multiplier gain table module 704 may be applied to the current engine torque to obtain the delta ABS reference speed. A first order filter 706 is applied to the delta ABS reference speed to smooth the output of module 504.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The present disclosure contemplates methods, systems, and program products on any machine-readable media for accomplishing various operations. As mentioned above, in certain embodiments, the AABS module forms a processing system or subsystem that includes one or more computing devices having memory, processing, and communication hardware. The AABS module may be a single device or a distributed device, and the functions of the controller or processor may be performed by hardware and/or as computer instructions on a non-transient computer (or machine) readable storage medium. Such computer-readable media can be any available media that can be accessed by a general purpose or special purpose computer or other machine with a processor. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. In certain embodiments, the AABS module includes one or more modules structured to functionally execute the operations described herein. The description herein including the components of the AABS module emphasizes the structural independence of the aspects of the AABS module, and illustrates one grouping of operations and responsibilities of the AABS module. Other groupings that execute similar overall operations are understood within the scope of the present application. Modules may be implemented in hardware and/or as computer instructions on a non-transient computer readable storage medium, and modules may be distributed across various hardware or computer based components.

Example and non-limiting module implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. A method, comprising:
receiving a load parameter input indicative of a first condition, wherein the first condition is an unloading condition, the load parameter input including an engine torque reduction, an uncommanded speed increase, a hydraulic system pressure, or an operator input corresponding to an unloading process;
determining a requested speed demand based on an accelerator pedal position;
detecting a change in load based on the load parameter input indicative of the unloading condition;
determining a modified speed demand based on the detected change in load due to the unloading condition;
comparing the modified speed demand to a second condition, wherein the second condition is an override and/or terminating condition for the modified speed demand, and wherein the override and/or terminating condition includes an engine acceleration limit; and
based on the comparison, one of:
adjusting the modified speed demand and modifying the requested speed demand to the modified speed demand; or
preventing modification of the requested speed demand to the modified speed demand.

2. The method of claim 1, wherein the modification to the speed demand is proportional to the change in load.

3. The method of claim 1, further comprising receiving a compressor torque demand, wherein determining the modified speed demand is further based on the compressor torque demand.

4. The method of claim 1, further comprising receiving a coolant temperature input, wherein determining the modified speed demand is further based on the coolant temperature input.

5. The method of claim 1, further comprising determining an operating mode, and wherein determining the modified speed demand is further based on the operating mode.

6. The method of claim 5, wherein the operating mode is selected by an operator via an operator input.

7. The method of claim 5, further comprising receiving vehicle parameter inputs and determining the operating mode based on the vehicle parameter inputs.

8. An apparatus, comprising:
a controller communicably coupled to an internal combustion engine and to a transmission, the controller structured to:
receive a load parameter input indicative of a first condition, wherein the first condition is an unloading condition, the load parameter input including an engine torque reduction, an uncommanded speed increase, a hydraulic system pressure, or an operator input corresponding to an unloading process;
determine a requested speed demand based on an accelerator pedal position;
detect a change in load based on the load parameter input indicative of the unloading condition;
determine a modified speed demand based on the detected change in load due to the unloading condition;
compare the modified speed demand to a second condition, wherein the second condition is an override and/or terminating condition for the modified speed demand, and wherein the override and/or terminating condition includes an engine acceleration limit; and
based on the comparison, one of:
adjust the modified speed demand and modify the requested speed demand to the modified speed demand; or
prevent modification of the requested speed demand to the modified speed demand.

9. The apparatus of claim 8, wherein the modification to the speed demand is proportional to the change in load.

10. The apparatus of claim 8, wherein the controller is further structured to receive a compressor torque demand, and wherein the controller is structured to determine the modified speed demand further based on the compressor torque demand.

11. The apparatus of claim 8, wherein the controller is further structured to receive a coolant temperature input, and wherein the controller is structured to determine the modified speed demand further based on the coolant temperature input.

12. The apparatus of claim 8, wherein the controller is further structured to receive an operating mode input, and wherein the controller is structured to determine the modified speed demand further based on the operating mode input.

13. The apparatus of claim 12, wherein the operating mode is selected by an operator via an operator input.

14. The apparatus of claim 12, wherein the controller is further structured to receive vehicle parameter inputs and to determine the operating mode based on the vehicle parameter inputs.

15. An apparatus, comprising:
an accelerator pedal based speed control module structured to determine a requested speed demand;
an unloading condition detection module structured to receive a load parameter input and detect a change in load based on the load parameter input, wherein the load parameter input is indicative of a first condition, wherein the first condition is an unloading condition, the load parameter input including an engine torque reduction, an uncommanded speed increase, a hydraulic system pressure, or an operator input corresponding to an unloading process; and
a delta accelerator based speed control module structured to determine a modified speed demand based on the requested speed demand and detected change in load due to the unloading condition;
wherein the accelerator pedal based speed control module is further structured to
compare the modified speed to a second condition, wherein the second condition is an override and/or a terminating condition for the modified speed demand, and wherein the override and/or terminating condition includes an engine acceleration limit; and based on the comparison, one of:
   adjusting the modified speed demand and modify the requested speed demand to the determined modified speed demand; or
   preventing modification of the requested speed demand to the modified speed demand.

16. The apparatus of claim 15, wherein the modification to the speed demand is proportional to the change in load.

17. The apparatus of claim 15, wherein the unloading condition detection module is further structured to receive an operator input corresponding to the unloading process, and wherein the unloading condition detection module is structured to detect the change in load further based on the operator input.

18. The apparatus of claim 15, wherein the delta accelerator based speed control module is further structured to receive a compressor torque demand, and wherein the delta accelerator based speed control module is structured to determine the modified speed demand further based on the compressor torque demand.

19. The method of claim 1, wherein determining the modified speed demand based on the detected change in load includes preventing the modified speed demand from exceeding a predefined upper limit and preventing the modified speed demand from falling below a predefined lower limit.

* * * * *